US012397458B2

(12) United States Patent
Papatriantafyllou et al.

(10) Patent No.: US 12,397,458 B2
(45) Date of Patent: *Aug. 26, 2025

(54) RAZOR BLADE

(71) Applicant: BIC-VIOLEX SA, Anixi (GR)

(72) Inventors: Ioannis Papatriantafyllou, Maroussi (GR); Taxiarchis Terlilis, Athenes (GR); Labros Kontokostas, N. Irakleio (GR)

(73) Assignee: BIC-VIOLEX SA, Anixi (GR)

( * ) Notice: Subject to any disclaimer, the term of this patent is extended or adjusted under 35 U.S.C. 154(b) by 340 days.

This patent is subject to a terminal disclaimer.

(21) Appl. No.: 17/551,841

(22) Filed: Dec. 15, 2021

(65) Prior Publication Data

US 2022/0105648 A1 Apr. 7, 2022

Related U.S. Application Data

(63) Continuation of application No. 15/535,984, filed as application No. PCT/EP2014/079091 on Dec. 22, 2014, now Pat. No. 11,230,024.

(51) Int. Cl.
*B26B 21/56* (2006.01)
*B26B 21/58* (2006.01)

(52) U.S. Cl.
CPC .............. *B26B 21/56* (2013.01); *B26B 21/58* (2013.01)

(58) Field of Classification Search
CPC ........ B26B 21/54; B26B 21/56; B26B 21/565; B26B 21/60
USPC .... 30/47–51, 346.5, 346.53–346.55, 346.58, 30/350, 357; 76/104.1, DIG. 8
See application file for complete search history.

(56) References Cited

U.S. PATENT DOCUMENTS 3,761,372 A 9/1973 Sastri
3,835,537 A * 9/1974 Sastri ....................... B26B 21/54 30/346.55
3,911,579 A 10/1975 Lane et al.
4,720,918 A 1/1988 Curry et al.
4,916,817 A * 4/1990 Atwater .................... B24B 3/48 30/346.55
5,032,243 A * 7/1991 Bache ....................... C23F 4/00 156/345.39
5,048,191 A 9/1991 Hahn
5,056,227 A * 10/1991 Kramer ................... B26B 21/54 76/DIG. 8

(Continued)

FOREIGN PATENT DOCUMENTS

DE 29718352 10/1997
EP 1 465 697 2/1977

(Continued)

OTHER PUBLICATIONS

International Search Report of PCT/EP2014/079091, dated Aug. 18, 2015.

*Primary Examiner* — Jason Daniel Prone
(74) *Attorney, Agent, or Firm* — POLSINELLI PC

(57) ABSTRACT

A razor blade including a substrate with a cutting edge portion ending in a sharpened tip. The substrate having a thickness of between 1.55 and 1.97 micrometers measured at a distance of five micrometers from the tip, a thickness of between 4.6 and 6.34 micrometers measured at a distance of twenty micrometers from the tip, and a thickness of between 19.8 and 27.12 micrometers measured at a distance of one hundred micrometers from the tip.

19 Claims, 5 Drawing Sheets

(56) References Cited

U.S. PATENT DOCUMENTS

| | | | | | |
|---|---|---|---|---|---|
| 5,088,195 | A * | 2/1992 | Lazarshik | B26B 21/56 | 30/346.55 |
| 5,088,202 | A * | 2/1992 | Boland | B26B 21/58 | 76/DIG. 8 |
| 5,129,289 | A | 7/1992 | Boland et al. | | |
| 5,142,785 | A * | 9/1992 | Grewal | B26B 21/60 | 76/DIG. 8 |
| 5,275,672 | A | 1/1994 | Althaus et al. | | |
| 5,497,550 | A * | 3/1996 | Trotta | B26B 21/60 | 30/346.55 |
| 5,669,144 | A | 9/1997 | Hahn et al. | | |
| 5,983,756 | A * | 11/1999 | Orloff | B26B 21/20 | 76/DIG. 8 |
| 6,105,261 | A * | 8/2000 | Ecer | B26B 21/58 | 76/DIG. 8 |
| 6,289,593 | B1 * | 9/2001 | Decker | B26B 21/60 | 30/346.54 |
| 6,327,784 | B1 * | 12/2001 | Altena | B26B 21/60 | 30/346.54 |
| 6,330,750 | B1 | 12/2001 | Meckel | | |
| 6,468,642 | B1 * | 10/2002 | Bray | B26B 21/60 | 428/408 |
| 6,684,513 | B1 | 2/2004 | Clipstone et al. | | |
| 7,060,367 | B2 | 6/2006 | Yamada et al. | | |
| 7,140,113 | B2 | 11/2006 | King et al. | | |
| 7,587,829 | B2 * | 9/2009 | King | B26B 21/58 | 30/346.54 |
| 7,758,707 | B2 | 7/2010 | Millward | | |
| 8,011,104 | B2 | 9/2011 | Masek et al. | | |
| 8,322,253 | B2 | 12/2012 | Howells | | |
| 8,409,462 | B2 * | 4/2013 | Keenan | A61B 17/32 | 216/101 |
| 8,499,462 | B2 | 8/2013 | Masek et al. | | |
| 8,769,833 | B2 | 7/2014 | Culf | | |
| 9,079,321 | B2 | 7/2015 | Claus et al. | | |
| 9,248,579 | B2 | 2/2016 | DePuydt et al. | | |
| 9,751,230 | B2 * | 9/2017 | Skrobis | B26B 21/60 | |
| 9,902,013 | B2 | 2/2018 | Uemura et al. | | |
| 10,549,438 | B2 | 2/2020 | Skrobis et al. | | |
| 11,230,024 | B2 * | 1/2022 | Papatriantafyllou et al. | B26B 21/56 | |
| 11,654,588 | B2 * | 5/2023 | Nisby | B26B 21/56 | 30/346.54 |
| 11,660,770 | B2 * | 5/2023 | Lee | B26B 21/60 | 30/346.5 |
| 2003/0208912 | A1 | 11/2003 | Park et al. | | |
| 2004/0121159 | A1 * | 6/2004 | Cloud | B26B 21/60 | 30/62 |
| 2004/0177516 | A1 | 9/2004 | Teeuw et al. | | |
| 2005/0160878 | A1 | 7/2005 | Wort et al. | | |
| 2006/0201001 | A1 | 9/2006 | Teeuw et al. | | |
| 2006/0265885 | A1 * | 11/2006 | Clipstone | B26B 21/60 | 30/346.54 |
| 2006/0277767 | A1 | 12/2006 | Sun et al. | | |
| 2007/0186424 | A1 * | 8/2007 | Becker | B26B 21/60 | 30/294 |
| 2007/0283578 | A1 * | 12/2007 | Newman | B26B 21/56 | 30/346.54 |
| 2008/0086888 | A1 * | 4/2008 | Scheinfeld | B26B 21/60 | 30/346.53 |
| 2008/0178476 | A1 | 7/2008 | Luttgens | | |
| 2008/0190758 | A1 * | 8/2008 | Papachristos | B26B 21/60 | 204/192.11 |
| 2009/0194203 | A1 * | 8/2009 | Hirai | B26B 21/60 | 148/226 |
| 2010/0011590 | A1 | 1/2010 | DePuydt et al. | | |
| 2010/0024222 | A1 * | 2/2010 | Akari | B26B 21/60 | 30/346.54 |
| 2010/0178493 | A1 * | 7/2010 | Wang | B26B 21/60 | 264/510 |
| 2010/0178515 | A1 * | 7/2010 | Wang | B26B 21/60 | 428/421 |
| 2010/0287781 | A1 * | 11/2010 | Skrobis | B26B 21/60 | 30/346.54 |
| 2010/0288097 | A1 * | 11/2010 | Uemura | B26B 21/54 | 83/651 |
| 2010/0299931 | A1 | 12/2010 | Marchev et al. | | |
| 2011/0010950 | A1 * | 1/2011 | Madeira | B26B 21/60 | 30/346.54 |
| 2011/0209988 | A1 * | 9/2011 | Madeira | B26B 21/60 | 204/192.16 |
| 2012/0276826 | A1 * | 11/2012 | Floter | B26B 21/60 | 83/651 |
| 2012/0311865 | A1 * | 12/2012 | Hamilton | B26B 21/60 | 30/346.5 |
| 2013/0014395 | A1 | 1/2013 | Patel et al. | | |
| 2013/0014396 | A1 | 1/2013 | Skrobis et al. | | |
| 2013/0031794 | A1 * | 2/2013 | Duff, Jr. | B26B 21/60 | 30/346.53 |
| 2015/0328789 | A1 | 11/2015 | Skrobis et al. | | |
| 2016/0016322 | A1 | 1/2016 | Islam et al. | | |
| 2018/0043561 | A1 | 2/2018 | Nisby et al. | | |
| 2018/0215056 | A1 | 8/2018 | Logothetidis et al. | | |
| 2020/0307006 | A1 | 10/2020 | Kontokostas et al. | | |
| 2020/0316802 | A1 | 10/2020 | Kontokostas et al. | | |
| 2021/0094199 | A1 | 4/2021 | Lee et al. | | |
| 2023/0311352 | A1 * | 10/2023 | Lee | B26B 21/56 | 30/346.5 |
| 2023/0311354 | A1 * | 10/2023 | Claus | B26B 21/60 | 30/346.53 |
| 2023/0347537 | A1 * | 11/2023 | Maziarz | B26B 21/56 | |
| 2023/0364818 | A1 * | 11/2023 | Park | B26B 21/56 | |
| 2023/0373119 | A1 * | 11/2023 | Skrobis | B26B 21/60 | |
| 2023/0373120 | A1 * | 11/2023 | Skrobis | B26B 21/60 | |
| 2023/0373121 | A1 * | 11/2023 | Skrobis | B26B 21/60 | |
| 2023/0373122 | A1 * | 11/2023 | Skrobis | B26B 21/60 | |
| 2024/0051167 | A1 * | 2/2024 | Duff, Jr. | B26B 21/60 | |
| 2024/0051168 | A1 * | 2/2024 | Duff, Jr. | B26B 21/60 | |
| 2024/0051169 | A1 * | 2/2024 | Duff, Jr. | B26B 21/60 | |
| 2024/0051170 | A1 * | 2/2024 | Duff, Jr. | B26B 21/60 | |
| 2024/0131740 | A1 * | 4/2024 | Gluche | B26B 21/56 | |
| 2024/0246251 | A1 * | 7/2024 | Jung | B26B 21/56 | |
| 2024/0300126 | A1 * | 9/2024 | Park | B26B 21/56 | |
| 2024/0308094 | A1 * | 9/2024 | Lee | B26B 21/56 | |
| 2024/0316810 | A1 * | 9/2024 | Lee | B26B 21/60 | |
| 2024/0383163 | A1 * | 11/2024 | Pandis | B26B 21/60 | |
| 2025/0135670 | A1 * | 5/2025 | Hanson | B26B 21/60 | |
| 2025/0153381 | A1 * | 5/2025 | Jung | B26B 21/60 | |
| 2025/0153382 | A1 * | 5/2025 | Jung | B26B 21/56 | |

FOREIGN PATENT DOCUMENTS

| | | | |
|---|---|---|---|
| EP | 0 126 128 | B1 | 6/1987 |
| EP | 0 363 648 | B1 | 3/1993 |
| EP | 0 612 280 | B1 | 2/1998 |
| EP | 0 255 834 | B1 | 5/1998 |
| EP | 0 589 756 | B1 | 7/1998 |
| EP | 0 884 142 | A1 | 12/1998 |
| EP | 0 582 676 | B1 | 3/2000 |
| EP | 1 259 361 | B1 | 11/2002 |
| EP | 0 757 615 | B1 | 3/2004 |
| EP | 1 397 234 | B1 | 4/2006 |
| EP | 1 601 507 | B1 | 8/2010 |
| EP | 2 323 819 | B1 | 10/2012 |
| EP | 2 326 470 | B1 | 10/2012 |
| EP | 2 495 080 | B1 | 5/2014 |
| WO | 03/006218 | A1 | 1/2003 |
| WO | 2006/079361 | A1 | 8/2006 |
| WO | 2007/095120 | A2 | 8/2007 |
| WO | 2008/065949 | A1 | 6/2008 |
| WO | 2009/143130 | A2 | 11/2009 |
| WO | 2010/008981 | A1 | 1/2010 |
| WO | 2013/010049 | A1 | 1/2013 |
| WO | 2013/010072 | A1 | 1/2013 |
| WO | 2015/179217 | A1 | 11/2015 |

* cited by examiner

RAZOR BLADE

CROSS-REFERENCE TO RELATED APPLICATIONS

This application is a continuation application of U.S. application Ser. No. 15/535,984, filed Jun. 14, 2017, issued as U.S. Pat. No. 11,230,024 on Jan. 25, 2022, which is a National Stage application of International Application No. PCT/EP2014/079091, filed on Dec. 22, 2014, each of which is hereby incorporated by reference in its entirety for all purposes.

BACKGROUND OF THE INVENTION

Field of the Disclosure

The disclosure relates to razors and more particularly to razor blades wherein the cutting area of the razor blade is profiled.

Description of the Related Art

The shape of a razor blade plays an important role in the quality of a shave. The blade typically has a continuously tapering shape converging toward an ultimate tip. The portion of the blade which is closest to the ultimate tip is called the tip edge.

If the tip edge is robust, it will enable less wear and a longer service life, but it would result in larger cutting forces, which adversely affect shaving comfort. A thin tip edge profile leads to less cutting forces but also to an increase in risk of breakage or damage, and a shorter service life. Therefore, an optimal trade-off between the cutting forces, the shaving comfort and the service life of the cutting edge of a razor blade is desired.

To achieve this optimal trade-off, the cutting edge of the razor blade is shaped using a grinding process.

Historically, there has been numerous technologies related to the geometry of some specific parts of the blade. A typical example includes a known technology that focuses on the geometry of the ultimate tip of the blade. The technology precisely defines the geometry of the tip up to 8000 Angstroms, that is 0.8 micrometers from the tip. This geometry mostly relates to the entry of the blade inside the hair to be cut (the diameter of which is generally of the order of 100 micrometers).

Other technologies focus on an overall view of the whole blade geometry. One example of uses numerical data and a specific angle to define the blade tip.

Other examples of technologies focus on blade geometries that are related to thinning the the blade within micrometers of the tip, in relation to a specific angle furthest away from the tip.

Still other examples of blade technologies focus on improving the tip shape by using a hyperbolic equation or constant facet convergence towards the tip of the blade to define the shape of the tip, with respect to a distance within micrometers from the tip.

SUMMARY OF THE INVENTION

It is an object of the disclosure to provide a razor blade, suitable for a shaving head of a shaver, wherein the wear of the razor blade may be reduced and the service life may be further extended, while the cutting forces may at least be equally small and the shaving comfort may at least be equally high.

According to an aspect, a razor blade substrate may include a symmetrical tapering cutting edge ending in a sharpened tip. The substrate may have a continuously tapering geometry toward the tip with a thickness of between 1.55 and 1.97 micrometers measured at a distance of five micrometers from the tip, a thickness of between 4.60 and 6.34 micrometers measured at a distance of twenty micrometers from the tip, a thickness of between 19.80 and 27.12 measured at a distance of hundred micrometers from the tip. Unless explicitly stated otherwise, all blade edge measurement data provided herein are obtained through confocal microscopy measurements.

It has been found that the definition of the geometry of the profile, according to the above-specified key points, may be essential to define a properly supported thin edge tip, which would in turn provide an optimal trade-off between shaving performance, in terms of comfort, since such a profile results in low cutting forces and adequate service life, due to the resulted geometry and the thickness beyond the 20 μm area from the ultimate tip.

According to an aspect, the substrate may have a thickness of between 6.50 and 8.94 micrometers measured at a distance of thirty micrometers from the tip.

According to an aspect, the substrate may have a thickness of between 8.40 and 11.54 micrometers measured at a distance of forty micrometers from the tip.

According to an aspect, the substrate may have a thickness of between 10.30 and 14.13 micrometers measured at a distance of fifty micrometers from the tip.

According to an aspect, the substrate may have a thickness of between 29.30 and 40.11 micrometers measured at a distance of hundred fifty micrometers from the tip.

According to an aspect, the substrate may have a thickness of between 38.80 and 49.74 micrometers measured at a distance of two hundred micrometers from the tip.

According to an aspect, the substrate may have a thickness of between 48.30 and 59.37 micrometers measured at a distance of two hundred fifty micrometers from the tip.

According to an aspect, the substrate may have a thickness of between 57.80 and 69.00 micrometers measured at a distance of three hundred micrometers from the tip.

According to an aspect, the substrate may have a thickness of between 67.30 and 78.62 micrometers measured at a distance of three hundred fifty micrometers from the tip.

According to an aspect, the substrate of the razor blade may have a thickness of between 1.80 and 1.95 micrometers measured at a distance of five micrometers from the tip.

According to an aspect, the substrate of the razor blade may have a thickness of between 5.40 and 6.30 micrometers measured at a distance of twenty micrometers from the tip.

According to an aspect, the substrate of the razor blade may have a thickness of between 7.00 and 8.00 micrometers measured at a distance of thirty micrometers from the tip.

According to an aspect, the substrate may have a thickness of between 9.20 and 10.70 micrometers measured at a distance of forty micrometers from the tip.

According to an aspect, the substrate of the razor blade may have a thickness of between 11.20 and 13.10 micrometers measured at a distance of fifty micrometers from the tip.

According to an aspect, the substrate of the razor blade may have a thickness of between 23.00 and 25.10 micrometers measured at a distance of hundred micrometers from the tip.

According to an aspect, the substrate of the razor blade may have a thickness of between 32.30 and 37.10 micrometers measured at a distance of hundred fifty micrometers from the tip.

According to an aspect, the substrate of the razor blade may have a thickness of between 41.00 and 47.30 micrometers measured at a distance of two hundred micrometers from the tip.

According to an aspect, the substrate of the razor blade may have a thickness of between 51.40 and 56.50 micrometers measured at a distance of two hundred fifty micrometers from the tip.

According to an aspect, the substrate of the razor blade may have a thickness of between 61.00 and 65.40 micrometers measured at a distance of three hundred micrometers from the tip.

According to an aspect, the substrate of the razor blade may have a thickness of between 70.40 and 76.10 micrometers measured at a distance of three hundred fifty micrometers from the tip.

According to an aspect, the thickness of the cutting edge of the substrate may be described with the following mathematical formulas:

$$t=a\cdot(xb) \quad \text{(A)}$$

$$t=(c\cdot x)+d \quad \text{(B)}$$

wherein, in formulas A and B, a and c are constants from an interval (0, 1), b is a constant from an interval (0.5, 1), d is a constant from an interval (0.5, 20), x refers to a distance from the tip in micrometers and t refers to the thickness of the blade in micrometers, and wherein equation A is applied from the tip to a transition point, and either equation A or equation B elsewhere. According to an aspect, the substrate may contain a stainless steel including in weight:

0.62-0.75% of carbon, 12.7-13.7% of chromium, 0.45-0.75% of manganese, 0.20-0.50% of Silicon, No more than traces of Molybdenum, Balanced iron. Balanced iron can mean that iron comprises the rest of the material by weight.

According to an aspect, the substrate may be covered by a strengthening coating.

According to an aspect, the strengthening coating comprises Titanium and Boron.

According to an aspect, the substrate may be covered by an interlayer, and the interlayer may be covered by said strengthening layer.

According to an aspect, the strengthening layer may be covered by a top layer.

According to an aspect, the top layer may be covered by a polytetrafluoroethylene layer.

According to some aspects, the thickness range between 50 and 350 μm distance from the tip may be important in order to achieve the desired geometry for shaving comfort and blade durability.

BRIEF DESCRIPTION OF THE DRAWINGS

Other characteristics and advantages of the disclosure will readily appear from the following description of some of embodiments, provided as non-limitative examples, and of the accompanying drawings.

In the drawings.

On the different Figures, the same reference signs designate like or similar elements.

DETAILED DESCRIPTION

Figure 6:
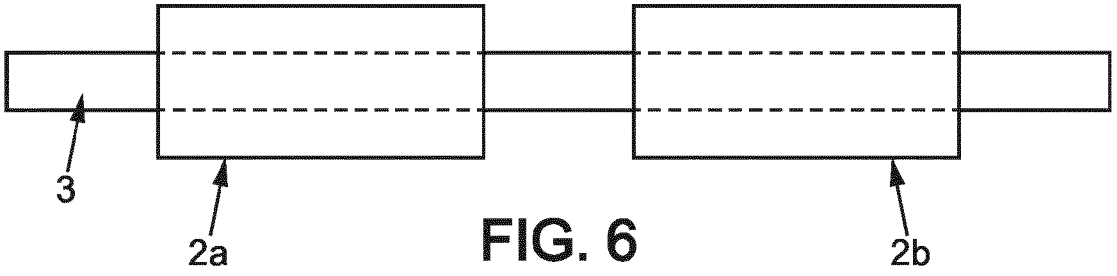
FIGS. 6 and 7 are schematic views of a grinding machine.
Figure 7:
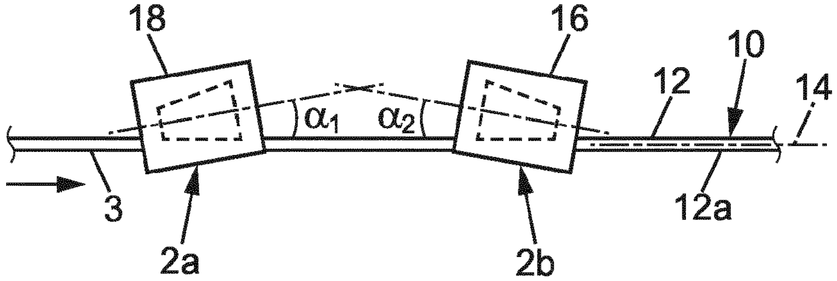

According to aspects of the disclosure, the desired blade profile may be achieved by a grinding process that involves two, three or four grinding stations. FIG. 6 schematically shows a grinding installation 1 having two stations 2*a* and 2*b*. The base material may be a continuous strip 3. The continuous strip 3 may be made of the raw material for the razor blade substrate, which may have been previously submitted to a suitable metallurgical treatment. This, for example, the continuous strip 3 may be stainless steel. The disclosure may also be applicable to razor blades with a substrate of carbon steel. According to other aspects, ceramic may be a possible material. These materials may be considered insofar as being suitable for razor blade materials. The continuous strip 3 may be longer than a plurality of razor blades, for example the continuous strip 3 may correspond to approximately 1000 individual razor blades or more. Before grinding, the continuous strip 3 may, generally speaking, be rectangular in cross-section. The height of the continuous strip 3 may be slightly over the height of one finished razor blade, or slightly over the height of two finished razor blades, if grinding is to be performed on both edges. The thickness of the continuous strip 3 may be the maximum thickness of the future razor blades. The continuous strip 3 may include through punches which may enable the continuous strip 3 to be carried along the installation 1 during the grinding process, and/or may be used to facilitate future separation of the individual razor blades from the continuous strip 3.

As the metal strip 3 moves along the grinding stations 2*a*, 2*b*, continuous strip 3 may be sequentially subjected to a rough grinding, a semi-finishing and a finishing grinding operation. Depending on the number of stations involved, the rough grinding and semi-finishing operation may be performed separately or in the same station. Thereafter, a finishing grinding operation may be required. The grinding steps may be performed continuously, in that the continuous strip 3 may be moved continuously through the stations without stopping.

When the rough grinding is performed separately, one or two grinding stations may be required. Each grinding station may utilize one or two abrading wheels that may be positioned parallel with respect to the moving continuous strip 3. The abrading wheels may have a uniform grit size along their length. The abrading wheels may also be full body or helically grooved along their length. The material of the abrading wheels may use resin-bonded or vitrified diamond, resin-bonded or vitrified CBN (Cubic Boron Nitride), or resin-bonded or vitrified silicon carbide, aluminum oxide grains or a mixture of the above grains.

When rough grinding and semi-finishing operations are performed simultaneously, a single grinding station may be required for these operations. In this case, the station may include two abrading wheels formed into spiral helixes or a sequence of straight discs with a special profile. The rotational axes of these wheels may be parallel or positioned at an angle α1 with respect to the moving continuous strip 3. The tilt angle ranges between 0.5 degrees and 2 degrees. The grit size of the wheels may also be uniform or progressively decreasing along their length towards the exit of the strip. The material of the abrading wheels might use resin-bonded or vitrified diamond, resin-bonded or vitrified CBN (Cubic Boron Nitride) or resin-bonded or vitrified silicon carbide, aluminum oxide grains or a mixture of the above grains.

The finishing operation may require a single grinding station with two abrading wheels positioned at an angle with respect to the moving continuous strip 3. The tilt angle α2 may be reversed compared to the tilt angle used in the rough grinding operation. The tilted angle may range between 1 degree and 5 degrees. The wheels may form spiral helixes and may be specially profiled. The abrasive material may be single grain or multi-grain material from the aforementioned CBN, silicon carbide, aluminum oxide or Diamond.

Figure 2:
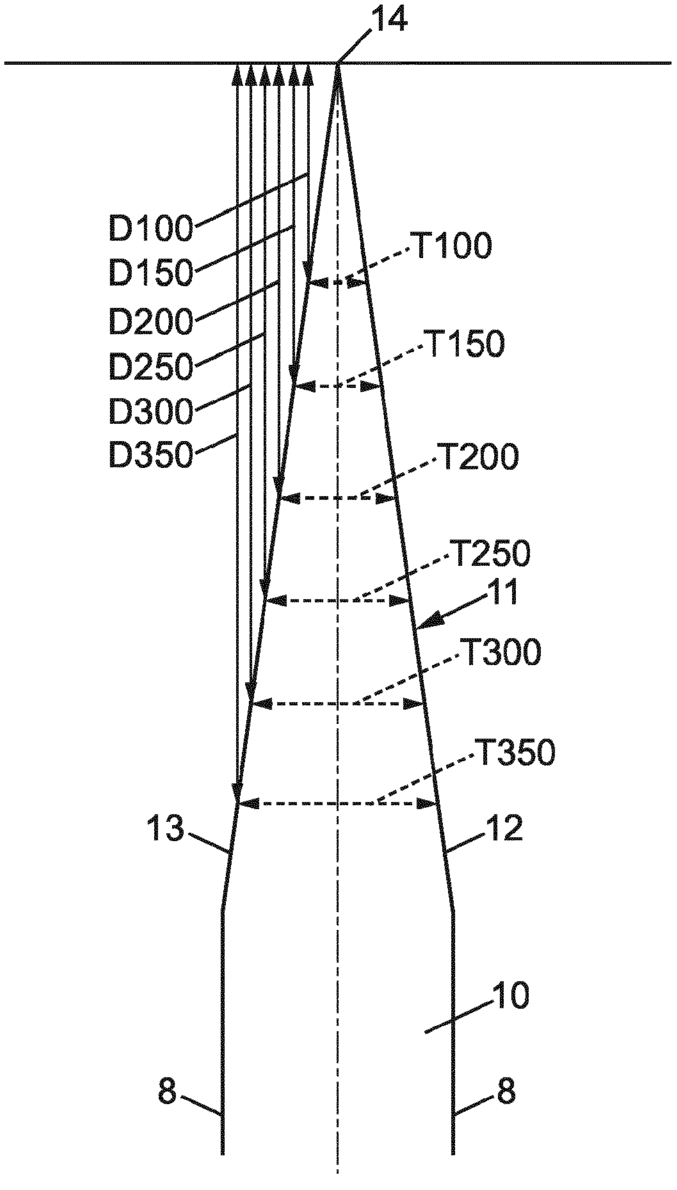
FIG. 2 is a profile view of the cutting edge of a razor blade.

The process may be tuned so as to obtain a symmetrical razor blade substrate 10 with a continuously tapering geometry toward the tip, as shown in FIG. 2.

Figure 5:
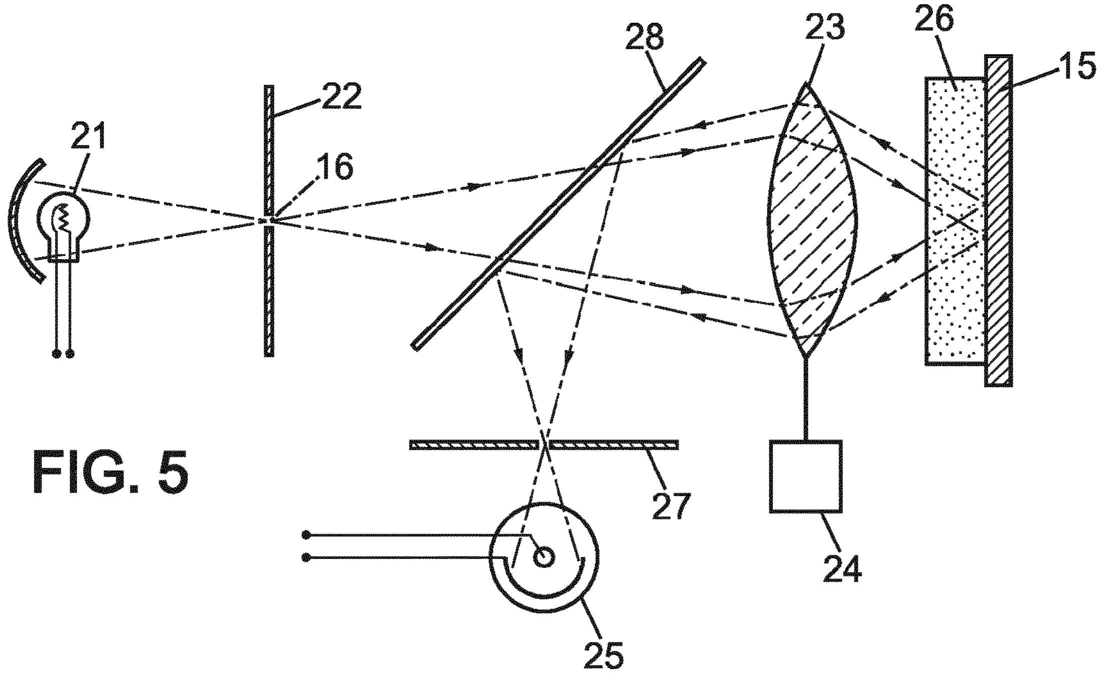
FIG. 5 is a schematic view of the confocal microscopy measurement system.

For the measurement of the blade geometry, surface roughness and grinded angle, a confocal microscope may be used. For example, is shown on FIG. 5, the confocal microscope may include a LED light source 21, a pinhole plate 22, an objective lens 23 with a piezo drive 24 and a CCD camera 25. The LED source 21 may be focused through the pinhole plate 22 and the objective lens 23 on to the sample 26 surface, which reflects the light. The reflected light may be reduced by the pinhole of the pinhole plate 22 to that part which may be in focus, and this falls on the CCD camera. The sample 26 shown here may not necessarily represent a razor blade. The razor blade may be used with a side angled with respect to the lens focus axis passing through the lens 23 within the device. The confocal microscope may have a given measurement field of, for example, 200 μm×200 μm. A semi-transparent mirror 28 may be used between the pinhole plate 22 and the lens 23 to direct the reflected light toward the CCD 25. Another pinhole plate 27 may be used for the filtering. However, the semi-transparent mirror 28 may be used between the light source and the pinhole plate 22, which may enable the use of only one pinhole plate for both the emitted light signal and the reflected light signal.

The piezo-drive 24 may be adapted to move the lens 23 along the light propagation axis, to change the position of the focal point in depth. The focal plane may be changed while keeping the dimensions of the measurement field.

To extend the measurement field (in particular, in order to measure the blade edge further away from the tip), another measurement may be performed at another location, and the data resulting from all measurements may be stitched.

The other side of the blade may then be measured, simply by flipping the blade to the other side.

According to one aspect, a confocal microscope based on the Confocal Multi Pinhole (CMP) technology may be used.

The pinhole plate 22 may have a large number of holes arranged in a special pattern. The movement of the pinhole plate 22 may enable seamless scanning of the entire surface of the sample within the image field and only the light from the focal plane may reach the CCD camera, with the intensity following the confocal curve. Thus, the confocal microscope may be capable of high resolution in the nanometer range.

Also, other methods may be used to measure the thickness of the razor blade. For example, measuring the cross-section of the blade by a Scanning Electron Microscope (SEM). SEM may be performed on a blade cross-section. Currently, SEM may be limited with regards to providing relevant measurement data because it is compulsory to prepare a cross-section of the razor blade. The preparation of samples to be imaged may be rather difficult, in that very few samples may be imaged, and the results may likely be non-statistically relevant.

According to other aspects, it may also possible to measure the thickness of the blade by an interferometer. For this measurement, white light probes from one of a variety of sources (halogen, LED, xenon, etc.) may be coupled into an optical fiber in the controller unit and transmitted to an optical probe. The emitted light may undergo reflection from the blade and may be collected back into the optical probe, and pass back up the fiber where it is collected into an analysis unit. The modulated signal is may be subjected to a fast Fourier transform to deliver a thickness measurement. However, since this measurement is based on light interference from the surface of the blade, the thickness measured by this method may be adversely affected.

Measurements of the same blade using the same method may be performed at different times by different operators in order to that the method is capable of being repeated. Test have shown that confocal microscopy may offer a much better repeatability and reproducibility than the interferometry method.

Additionally, numerous measurements were carried out with the above-mentioned measurement methods on several blades in order to determine the correct thickness of the cutting edge. The average results of these measurements are depicted in the following Table 1.

TABLE 1

Comparison of thickness measuring methods

| Distance from the tip [μm] | Thickness of the blade [μm] Interferometer | Confocal microscope |
|---|---|---|
| 4 | 1.55 | 1.79 |
| 5 | 1.88 | 2.16 |
| 8 | 2.84 | 3.16 |
| 16 | 5.22 | 5.59 |
| 20 | 6.40 | 6.74 |

From the above Table 1, it may be apparent that the results of the interferometry measurement method are different from the results of the confocal microscopy method. Therefore, in view of the better reproducibility of the measurement using confocal microscopy as discussed above, the dimensions are obtained by measurement using the above confocal microscopy method.

Figure 1:
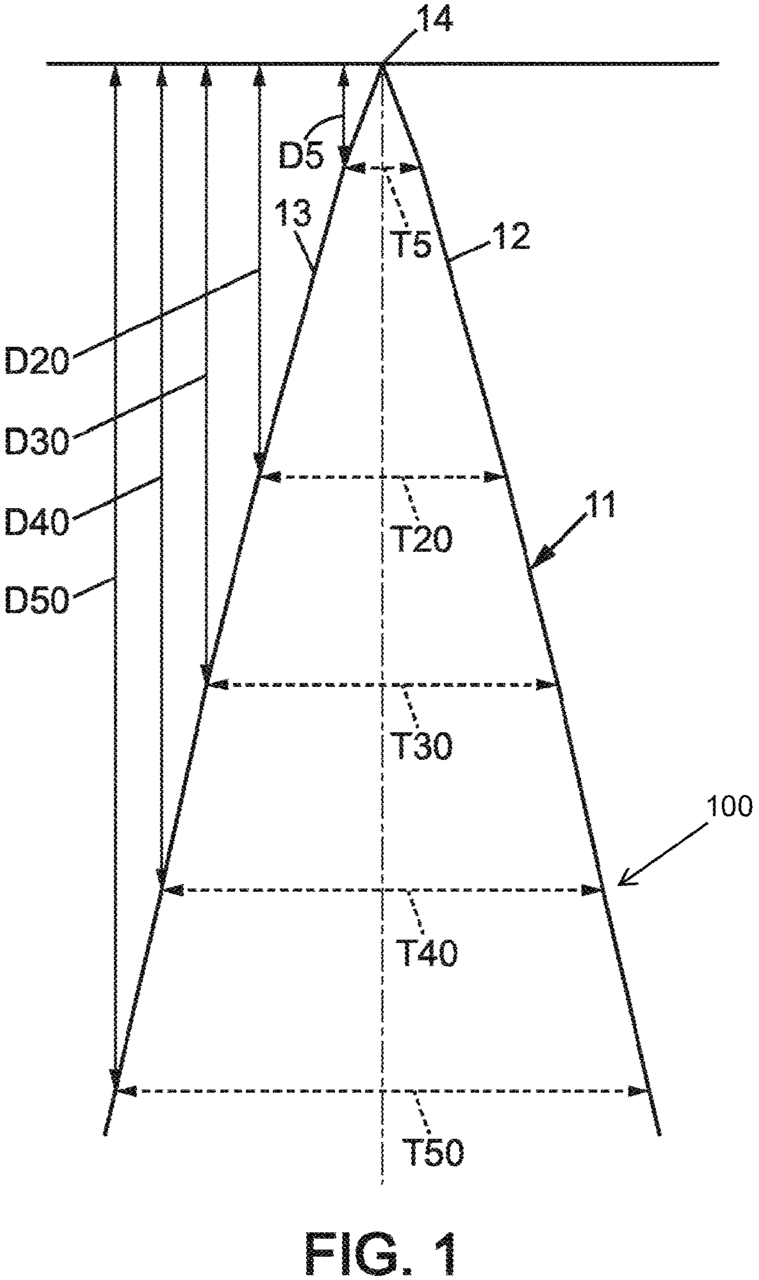
FIG. 1 is a profile view of the ultimate tip of a razor blade.

According to an aspect, the razor blade, may include a blade substrate 10 which may be sharpened. The blade substrate 10 may have a planar portion 8, wherein the two opposite sides of the blade may be parallel to each other. Further, the blade substrate 10 may also include a cutting edge portion 11, shown in cross-section on FIG. 1 and FIG. 2. The cutting edge portion 11 may be connected to a planar portion 8, and may have sides 12 and 13 that taper and converge to a substrate tip 14. The thickness of the cutting edge portion 11 may be measured by a confocal microscope. The shape of the blade may be profiled, meaning that the cross-section of the blade may be roughly identical along the length of the blade.

Razor blades with various geometries may have been manufactured, measured, and tested for shaving performance. Manufacture may include, not only substrate sharpening by grinding, but also coatings as will be described below. For the shaving tests, only the grinding step may be modified in order to generate various substrate geometries, the other process steps may be kept equal.

The tests determined that the thinness of the tip edge may be defined by checking the thickness of control points located 5 and 20 micrometers from the tip. Further, the strength of the edge tip may be defined by checking the thickness of control points located 20 and 100 micrometers from the tip.

Further, the dimensions given here may be average dimensions along the length of the blade. Due to the manufacturing process, a single blade may not have exactly the same profile along its whole length. Hence, each thickness value may be an average value of various data obtained along the length, for example, between 4 and 10 data.

After intense testing, it was determined that suitable shaving effects may be obtained for blades having the following features:

The cutting edge portion 11 of the blade may have a thickness of T5 between 1.55 and 1.97 micrometers measured at a distance D5 of five micrometers from the tip.

The cutting edge portion 11 of the blade may have a thickness of T20 between 4.60 and 6.34 micrometers measured at a distance D20 of twenty micrometers from the tip.

The cutting edge portion 11 of the blade may have a thickness of T100 between 19.80 and 27.12 micrometers measured at a distance D100 of hundred micrometers from the tip.

The above dimensions may be obtained through a dispersion of products manufactured using the same manufacturing process.

The blade may have a smooth profile in between and beyond (both from and away from the tip) these control points. The above-mentioned results may the profiles as detailed in Table 2 (although measured thickness geometry in other check points may not be considered as relevant in terms of qualifying the quality of the product).

TABLE 2

Suitable blade profile parameters

| Distance from tip [μm] | Lower thickness limit [μm] | Upper thickness limit [μm] |
|---|---|---|
| 5 | 1.55 | 1.97 |
| 20 | 4.60 | 6.34 |
| 30 | 6.50 | 8.94 |
| 40 | 8.40 | 11.54 |
| 50 | 10.30 | 14.13 |
| 100 | 19.80 | 27.12 |
| 150 | 29.30 | 40.11 |
| 200 | 38.80 | 49.74 |
| 250 | 48.30 | 59.37 |
| 300 | 57.80 | 69.00 |
| 350 | 67.30 | 78.62 |

According to some aspects, the thickness of the cutting edge portion 11 may have the following configuration of thicknesses. The thickness T5 may be between 1.80 and 1.95 micrometers measured at a distance D5 of five micrometers from the tip. The thickness T20 may be between 5.40 and 6.30 micrometers measured at a distance D20 twenty micrometers from the tip. The thickness of T100 may be between 23.00 and 25.10 micrometers measured at a distance D100 hundred micrometers from the tip.

In such cases, the thickness configuration may be detailed in following Table 3.

TABLE 3

Suitable blade profile parameters

| Distance from tip [μm] | Lower thickness limit [μm] | Upper thickness limit [μm] |
|---|---|---|
| 5 | 1.80 | 1.95 |
| 20 | 5.40 | 6.30 |
| 30 | 7.00 | 8.00 |
| 40 | 9.20 | 10.70 |
| 50 | 11.20 | 13.10 |
| 100 | 23.00 | 25.10 |
| 150 | 32.30 | 37.10 |
| 200 | 41.00 | 47.30 |
| 250 | 51.40 | 56.50 |
| 300 | 61.00 | 65.40 |
| 350 | 70.40 | 76.10 |

According to further aspects, Table 4 may detail examples of thickness configurations.

TABLE 4

Blade profile parameters

| Distance from the tip [μm] | Thickness [μm] |
|---|---|
| 0 | 0.00 |
| 5 | 1.81 |
| 20 | 5.49 |
| 30 | 7.60 |
| 40 | 9.56 |
| 50 | 11.50 |
| 100 | 21.50 |
| 150 | 31.50 |
| 200 | 41.50 |
| 250 | 51.50 |
| 300 | 61.50 |
| 350 | 71.50 |

The blade thickness increase rate (slope) from the tip up to the transition point may be continuously decreasing, making the blade edge easier to penetrate the hair leading to better comfort. The blade profile after the transition point 100 (for example from 40 μm to 350 μm) may be lying in a specific range of values in order to support a geometrically smooth transition from the first 40 μm to the unground part of the blade. In this region, the thickness increase rate may be less than, or equal to, the increase rate at 40 μm.

The blade edge profile generated by the rough grinding stage, typically covering an area between 50-350 μm from the tip, may determine the material removal rate of the finishing operation. Generally, the finishing grinding stage may be mainly called to smoothen out the excess surface roughness produced by rough grinding along with the final shaping of the blade edge profile. For optimal process efficiency, the material removal rate of finishing grinding wheel may be kept to a minimum but such that the induced surface roughness ranges between 0.005-0.040 μm.

For example, the thickness of the aforementioned blade profile may be described with the following mathematical formulas:

$$t=a\cdot(xb) \quad (A)$$

$$t=(c\cdot x)+d \quad (B)$$

In the above formulas, a and c may be constants from an interval [0, 1], b may also a constant from an interval [0.5, 1], d may be a constant from an interval [0.5, 20], x may refer to a distance from the tip in micrometers and t may refer to the thickness of the blade in micrometers.

One or more formulas (A) may be applied one after the other to the portion of the blade extending from the tip to a transition point 100, and one or more formulas (B) may be applied one after the other from the transition point 100 to the unground portion of the blade.

According to some aspects, formula (A) may describe the thickness of the cutting edge portion 11 from 0 to 40 micrometers from the tip, where a=0.5 and b=0.8 may be constants. Formula (B) may describe the thickness of the cutting edge portion 11 from 40 to 350 micrometers from the tip, with constants c=0.2 and d=1.5.

According to another aspect, the thickness of the cutting edge portion 11 of the blade may have the following thickness configuration as detailed in following Table 5.

TABLE 5

Blade profile parameters according another aspect

| Distance from the tip [μm] | Thickness [μm] |
|---|---|
| 5 | 1.82 |
| 20 | 5.82 |
| 30 | 8.33 |
| 40 | 10.84 |
| 50 | 13.35 |
| 100 | 25.90 |
| 150 | 38.45 |
| 200 | 47.38 |
| 250 | 56.25 |
| 300 | 65.13 |
| 350 | 74.00 |

Further, the thickness of the blade profile may be described by the above mentioned mathematical formulas (A) and (B).

Accordingly, formula (A) may describe the thickness of the cutting edge portion 11 from 0 to 20 micrometers, with constants a=0.47 and b=0.84. Formula (B) may describe the thickness of the cutting edge portion 11 from 20 to 150 micrometers, with constants c=0.251 and d=0.800. Formula (B) may also describe the thickness of the cutting edge portion 11 from 150 to 350 micrometers, with constants c=0.1775 and d=11.8750.

According to yet another aspect, the thickness of the cutting edge portion 11 of the blade may have the following thickness configuration as detailed in the following Table 6.

TABLE 6

Blade profile parameters according to yet another aspect

| Distance from the tip [μm] | Thickness [μm] |
|---|---|
| 5 | 1.60 |
| 20 | 4.80 |
| 30 | 7.00 |
| 40 | 9.15 |
| 50 | 11.25 |
| 100 | 22.44 |
| 150 | 31.26 |
| 200 | 40.86 |
| 250 | 50.28 |
| 300 | 59.57 |
| 350 | 68.75 |

Further, the thickness of the blade profile may be described by the above mentioned mathematical formula (A).

Accordingly, formula (A) may describe the thickness of the cutting edge portion 11 from 0 to 20 micrometers, with constants a=0.45 and b=0.79. Formula (A) may also describe the thickness of the cutting edge portion 11 from 20 to 350 micrometers, with constants a=0.296 and b=0.93.

According to a further aspect, the thickness of the cutting edge portion 11 of the blade may have the following thickness configuration, as detailed in the following Table 7.

TABLE 7

Blade profile parameters according to a further aspect

| Distance from the tip [μm] | Thickness [μm] |
|---|---|
| 5 | 1.96 |
| 20 | 5.93 |
| 30 | 8.54 |
| 40 | 11.06 |
| 50 | 13.52 |
| 100 | 25.24 |
| 150 | 36.35 |
| 200 | 47.10 |
| 250 | 56.10 |
| 300 | 65.10 |
| 350 | 74.10 |

The thickness of the blade profile may be described by the above mentioned mathematical formulas (A) and (B).

Accordingly, formula (A) may describe the thickness of the cutting edge portion 11 from 0 to 20 micrometers, with constants a=0.54 and b=0.80. Formula (A) may also describe the thickness of the cutting edge portion 11 from 20 to 200 micrometers, with constants a=0.40 and b=0.90. Formula (B) may describe the thickness of the cutting edge portion 11 from 200 to 350 micrometers, with constants c=0.18 and d=11.10.

All the above aspects, which relate to the tip 14 and to the cutting edge portion 11 of the razor may be described by formula (A) and formula (B) or with the combination of both formulas. The formulas (A) and (B) may describe different sections measured from the tip 14 of the razor.

The razor blade substrate 10 including the cutting edge portion 11 may be made of stainless steel. A suitable stainless steel may include in weight 0.62-0.75% of carbon,
12.7-13.7% of chromium,
0.45-0.75% of manganese,
0.20-0.50% of Silicon,
No more than traces of Molybdenum,
Balanced iron. Balanced iron can mean that iron comprises the rest of the material by weight.

Other stainless steels may also be used. Other materials which are known as razor blade substrate materials, may also be considered.

The following manufacturing steps of a razor blade may be described below.

The blade substrate 10 including a cutting edge portion 11 having a profiled geometry and having a tapering geometry with two substrate sides 12, 13 converging toward a substrate tip 14, may be covered by a strengthening coating 16 deposited on the razor blade substrate at least at the cutting edge portion 11. Coating layers may be implemented on the blade edge substrate to improve the hardness of the blade edge and to thereby enhance the quality of the shaving.

The coating layers may reduce wear of the blade edge, may improve the overall cutting properties and may prolong the usability of the razor blade.

Figure 3:
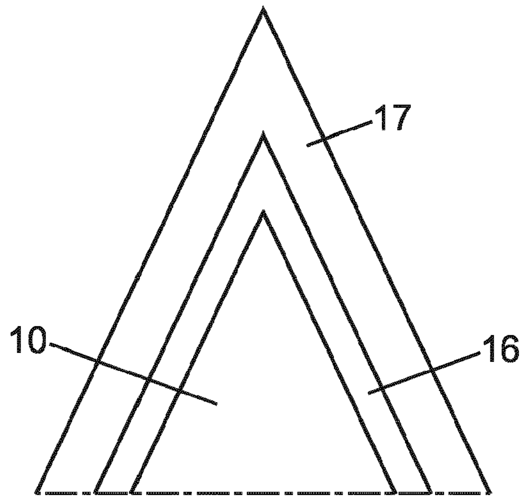
FIG. 3 is a profile view of a cutting edge of a razor blade covered by coating layers.
Figure 4:
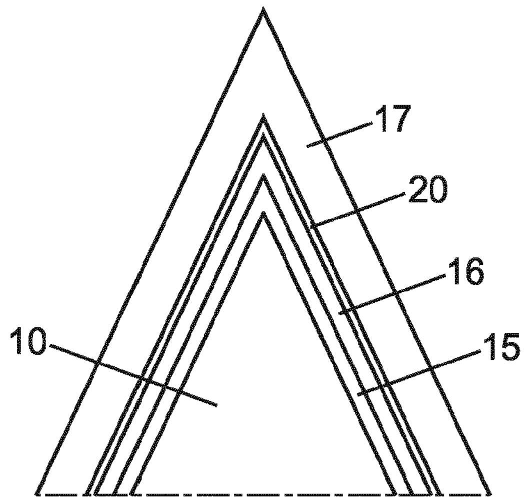
FIG. 4 is a profile view of a cutting edge of a razor blade covered by coating layers.

The strengthening coating 16 covering the substrate tip 14, may have a profiled geometry and may have a tapering geometry with two coating sides converging toward a coating tip. As shown in FIG. 3, the blade edge substrate 10 may be coated with a strengthening coating layer 16 and a lubricating layer 17. The lubricating layer 17, which may comprise fluoropolymer, is commonly used in the field of razor blades for reducing friction during shaving. The strengthening coating layer 16 may also be used for mechanical properties. For example, the strengthening coating layer 16 may include titanium and boron. More precisely, the strengthening coating layer 16 may be made of titanium and boron with a low content of impurities. The content of impurities may be kept as low as economically possible. The strengthening coating layer 16 may be prepared with various proportions of titanium and boron within the layer. Other aspects may include a mixture of chromium and carbon, DLC, amorphous diamond, or other similar materials. The cutting edge portion 11 of the blade may be covered by an interlayer 15. For example, the interlayer 15 may be made of Titanium, notably in the case of a titanium- and boron-containing strengthening coating layer 16. In a case where the blade may be covered by a Titanium interlayer 15, the interlayer 15 may be implemented prior to the strengthening coating layer 16. Thus, the coating layer configuration of the cutting edge portion 11 of the blade may include a Titanium interlayer 15 covering the cutting edge portion 11 of the blade and strengthening coating layer 16 covering the Titanium interlayer 15. Further, the strengthening coating layer 16 may be covered by a top layer 20. For example, a top layer may be made of Chromium. The top layer 20 including Chromium may also be covered by a lubricating layer 17, which may include a fluoropolymer, as shown on FIG. 4.

Figure 8A:
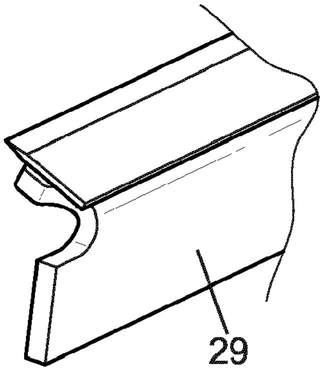
FIGS. 8*a* and 8*b* are cross-sectional views of two aspects of a razor blade.
Figure 8B:
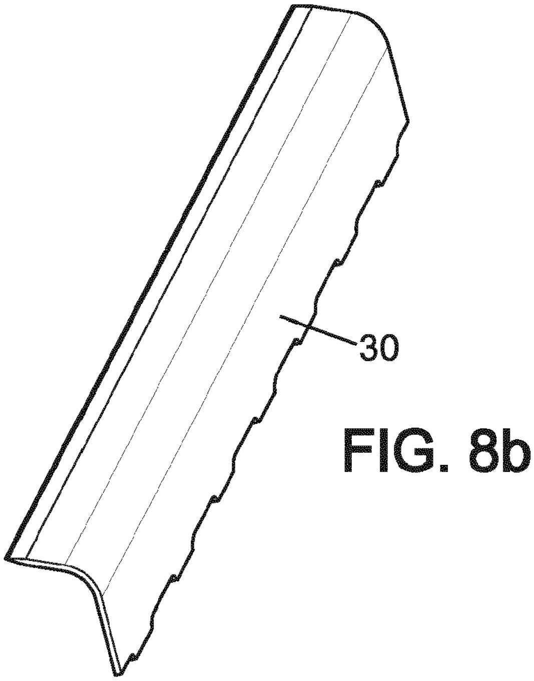

The blade may be fixed or mechanically assembled to a razor head, and the razor head itself may be part of a razor. The blade may be movably mounted in a razor head, and mounted on springs which urge it toward a rest position. The blade may be fixed, notably welded to a support 29, notably a metal support with a L-shaped cross-section, as shown in FIG. 8*a*. Alternatively, the blade may be an integrally bent blade, as shown on FIG. 8*b*, where the above disclosed geometry applies between the blade tip and the bent portion 30.

The invention claimed is:

1. A razor blade comprising a substrate including a cutting edge having a symmetrical tapering geometry with two substrate sides and a planar portion ending in a sharpened tip, the tapering geometry having a thickness of between 1.55 and 1.97 micrometers measured at a distance of five micrometers from the tip, to a thickness of between 4.60 and 6.34 micrometers measured at a distance of twenty micrometers from the tip, to a thickness of between 19.8 and 27.12 micrometers measured at a distance of hundred micrometers from the tip, wherein the thickness of the cutting edge of the substrate is described with the following mathematical formulas:

$$t=a\cdot(x^b) \quad \text{(A)}$$

$$t=(c\cdot x)+d \quad \text{(B)}$$

wherein, a and c are constants from an interval (0, 1), b is a constant from an interval (0.5, 1), d is a constant from an interval (0.5, 20), x refers to a distance from the tip in micrometers and t refers to the thickness of the blade in micrometers, and wherein equation (A) is used to determine the thickness of the cutting edge from the tip to a transition point, and equation (B) is used to determine the thickness of the cutting edge starting from the transition point, wherein a blade thickness increase rate is defined by a slope from the sharpened tip to the transition point, wherein the blade thickness increase rate in a region between the tip to the transition point is greater than the blade thickness increase rate of the cutting edge starting from the transition point.

2. The razor blade according to claim 1, wherein the tapering geometry of the substrate further includes a thickness of between 6.50 and 8.94 micrometers measured at a distance of thirty micrometers from the tip, wherein the tapering geometry of the substrate further includes a thickness of between 8.40 and 11.54 micrometers measured at a distance of forty micrometers from the tip, wherein the tapering geometry of the substrate further includes a thickness of between 10.30and 14.13 micrometers measured at a distance of fifty micrometers from the tip, wherein the tapering geometry of the substrate further includes a thickness of between 29.30and 40.11 micrometers measured at a distance of hundred fifty micrometers from the tip, wherein the tapering geometry of the substrate further includes a thickness of between 38.80 and 49.74 micrometers measured at a distance of two hundred micrometers from the tip.

3. The razor blade according to claim 1, wherein the tapering geometry of the substrate further includes a thickness of between 48.30 and 59.37 micrometers measured at a distance of two hundred fifty micrometers from the tip.

4. The razor blade according to claim 1, wherein the tapering geometry of the substrate further includes a thickness of between 57.80 and 69.00 micrometers measured at a distance of three hundred micrometers from the tip.

5. The razor blade according to claim 1, wherein the tapering geometry of the substrate further includes a thickness of between 67.30 and 78.62 micrometers measured at a distance of three hundred fifty micrometers from the tip.

6. The razor blade according to claim 1, wherein the substrate is a stainless steel comprising, in weight:

0.62-0.75% of carbon,
12.7-13.7% of chromium, 0.45-0.75% of manganese,
0.20-0.50% of Silicon,
no more than traces of Molybdenum, and
balanced iron.

7. The razor blade according to claim 1, wherein the substrate is covered by a strengthening coating.

8. The razor blade according to claim 7, wherein the strengthening coating comprises Titanium and Boron.

9. The razor blade according to claim 8, wherein the substrate is covered by an interlayer and the interlayer is covered by the strengthening layer.

10. The razor blade according to claim 8, wherein the strengthening layer is covered by a top layer.

11. The razor blade according to claim 10, wherein the top layer is covered by a polytetrafluoroethylene (PTFE) layer.

12. The razor blade according to claim 1, wherein the blade thickness increase rate in a region between a distance from 40 micrometers to 300 micrometers from the tip is less than the blade thickness increase rate from the tip of the blade to the distance of 40 micrometers from the tip.

13. The razor blade according to claim 12, wherein the blade thickness increase rate in a region between a distance from 40 micrometers to 350 micrometers from the tip is less than the blade thickness increase rate from the tip of the blade to the distance of 40 micrometers from the tip.

14. The razor blade according to claim 1, wherein the transition point is between about 20 micrometers from the tip to about 40 micrometers from the tip.

15. The razor blade according to claim 1, wherein equation (A) is used to determine the thickness of the cutting edge from the tip to about 40 micrometers from the tip, where a=0.5 and b=0.8, and either equation (A) or equation (B) with constants c=0.2 and d=1.5 used to determine the thickness of the cutting edge from about 40 micrometers from the tip.

16. The razor blade according to claim 1, wherein equation (A) is used to determine the thickness of the cutting edge from the tip to about 20 micrometers from the tip, where a=0.47 and b=0.84, and either equation (A) or equation (B) with constants c=0.251 and d=0.800 used to determine the thickness of the cutting edge from about 20 micrometers from the tip.

17. The razor blade according to claim 1, wherein equation (B) is used to determine the thickness of the cutting edge from about 150 micrometers to about 350 micrometers, with constants c=0.1775 and d=11.8750.

18. The razor blade according to claim 1, wherein equation (A) is used to determine the thickness of the cutting edge from the tip to about 20 micrometers from the tip, where a=0.45 and b=0.79, and either equation (A) or equation (B) with constants c=0.296 and d=0.93 used to determine the thickness of the cutting edge from about 20 micrometers from the tip.

19. The razor blade according to claim 1, wherein equation (A) is used to determine the thickness of the cutting edge from the tip to about 20 micrometers from the tip, where a=0.54 and b=0.80, and equation (A) with constants a=0.40 and b=0.90 used to determine the thickness from about 20 micrometers from the tip to about 200 micrometers from the tip, and equation (B) with constants c=0.18 and d=11.10 is used to determine the thickness from about 200 micrometers to about 350 micrometers from the tip.

* * * * *